United States Patent
Monovoukas

Patent Number: 5,378,879
Date of Patent: Jan. 3, 1995

[54] INDUCTION HEATING OF LOADED MATERIALS

[75] Inventor: Yiannis A. Monovoukas, Menlo Park, Calif.

[73] Assignee: Raychem Corporation, Menlo Park, Calif.

[21] Appl. No.: 49,900

[22] Filed: Apr. 20, 1993

[51] Int. Cl.$^6$ .............................................. H05B 6/10
[52] U.S. Cl. ..................... 219/634; 219/633; 219/635; 156/379.7; 174/23 R; 174/77 R
[58] Field of Search ............. 219/10.491, 10.43, 10.53, 219/10.75, 618, 633, 634, 660, 649, 759, 635; 174/23 R, 23 C, 77 R; 156/272.4, 379.7

[56] References Cited

U.S. PATENT DOCUMENTS

| | | | |
|---|---|---|---|
| 4,035,547 | 7/1977 | Heller, Jr. et al. | 219/10.53 |
| 4,369,345 | 1/1983 | Czerlinski | 219/10.43 |
| 4,693,767 | 9/1987 | Grzanna | 174/77 R |
| 4,969,968 | 11/1990 | Leatherman | 219/10.53 |
| 4,972,042 | 11/1990 | Seabourne et al. | 174/23 R |
| 4,972,058 | 11/1990 | Benson et al. | 219/10.55 F |
| 5,003,142 | 3/1991 | Fuller | 219/10.55 E |
| 5,049,714 | 9/1991 | Beresniewicz et al. | 219/10.55 F |
| 5,123,989 | 6/1992 | Horiishi et al. | 219/10.41 |
| 5,245,151 | 9/1993 | Chamberlain et al. | 219/10.57 |

Primary Examiner—Philip H. Leung
Attorney, Agent, or Firm—Sheri M. Novack; Herbert G. Burkard

[57] ABSTRACT

A system for employing induction heating to heat a non-magnetic, electrically non-conductive material in situ quickly, uniformly, selectively and in a controlled fashion. Particles which are essential to the improved use of induction heating for this type of application are added to the host material and exposed to high frequency alternating electromagnetic fields such as those produced in an induction coil. The particles are ferromagnetic, having high magnetic permeability and high electrical conductivity. The heat-generating efficiency of these particles when exposed to alternating magnetic fields, permits a smaller volume fraction of these particles in the host material such that the desired properties of the article remain essentially unchanged. Overheating of the article may be prevented by selecting the particle Curie point such that the particle autoregulates at a temperature about equal to the temperature to which the article is to be heated. These particles preferably have the configuration of a flake, i.e., a thin disk-like configuration. This configuration includes a first, second and third orthogonal dimension, wherein the first and second orthogonal dimensions are each greater than the skin depth of the particle and are each at least about 5 times the third orthogonal dimension.

28 Claims, 2 Drawing Sheets

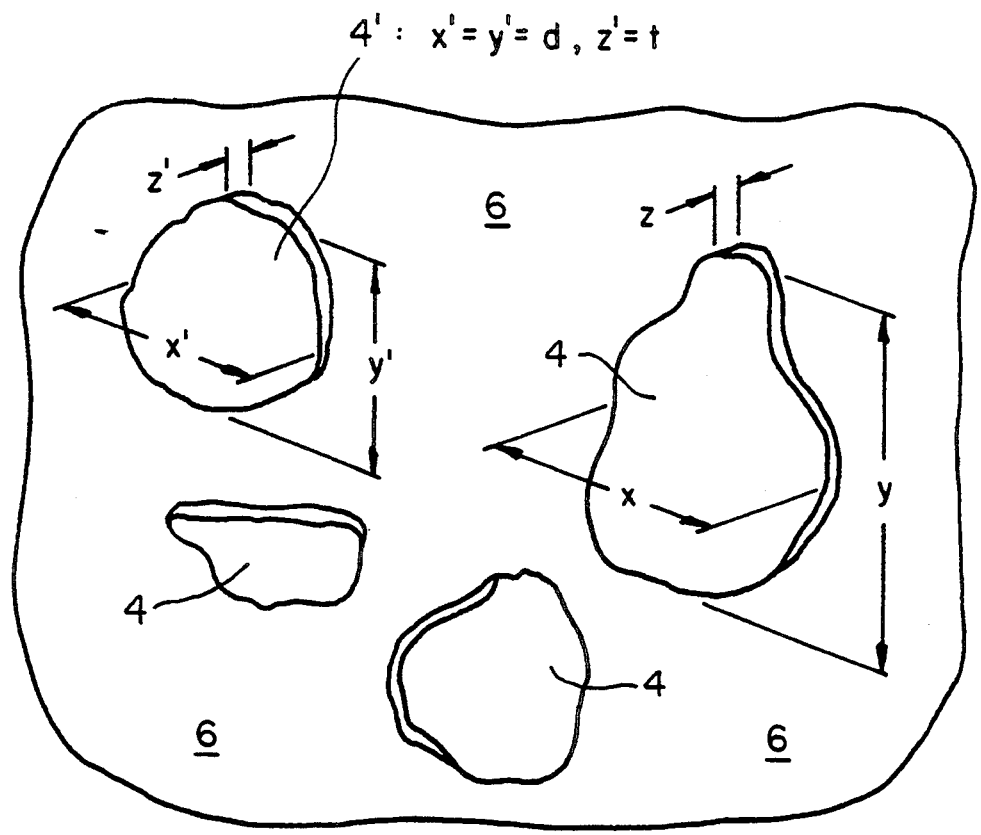
FIG_1
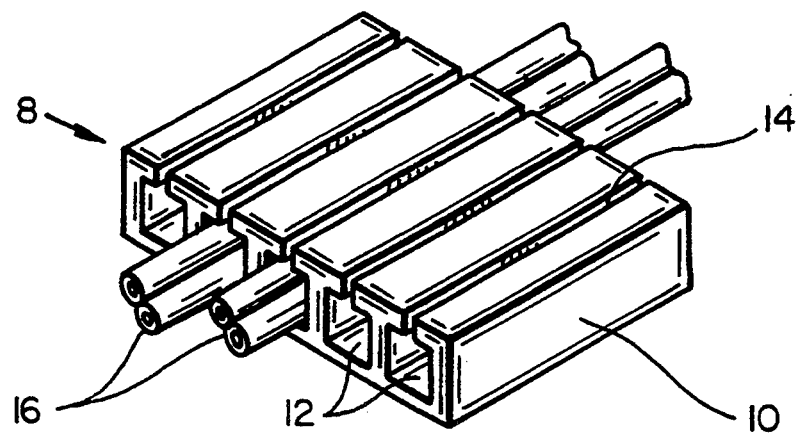
FIG_2A

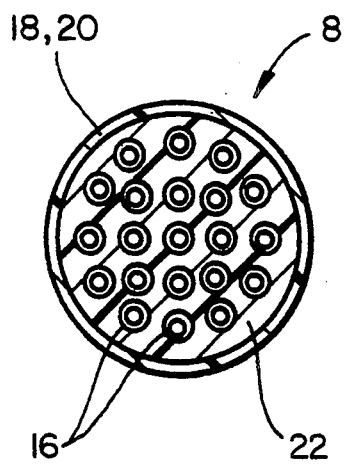
FIG_2B
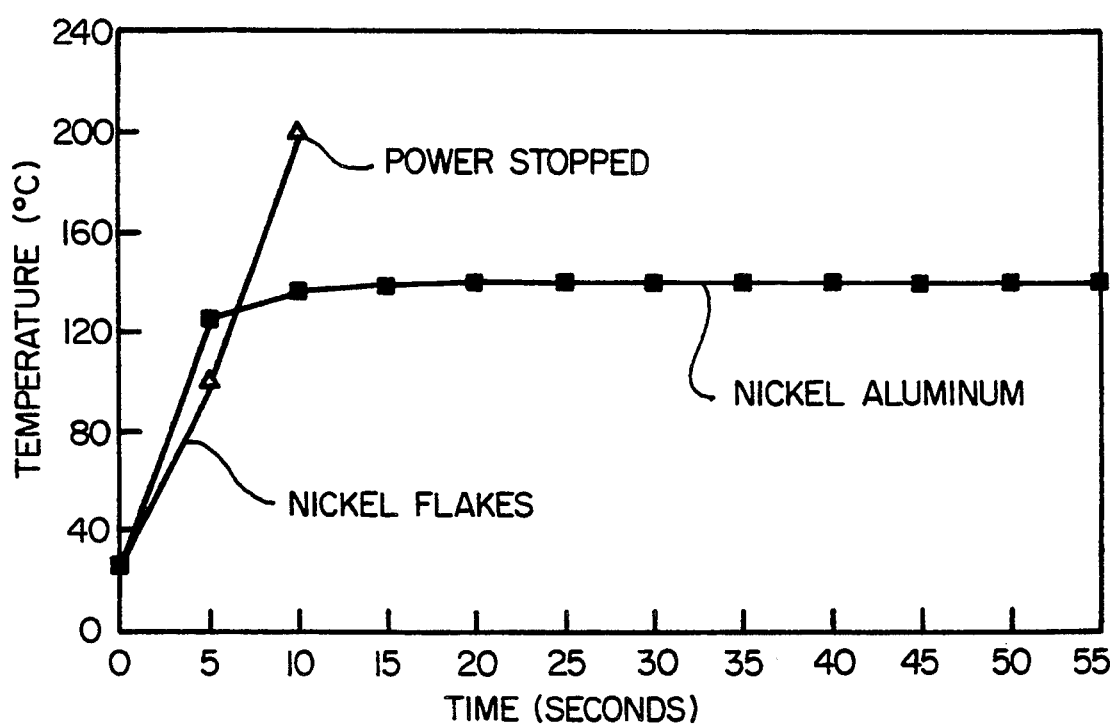
FIG_3

INDUCTION HEATING OF LOADED MATERIALS

This invention relates to high frequency magnetic induction heating of materials.

BACKGROUND OF THE INVENTION

Various technologies require the heating of material to achieve a transition of the material from an initial state to a final state exhibiting desired characteristics. For example, heat is employed to recover polymeric heat recoverable articles such as heat shrink tubing and molded parts, cure gels, melt or cure adhesives, activate foaming agents, dry inks, cure ceramics, initiate polymerization, initiate or speed up catalytic reactions, or heat treat parts among other applications.

The speed at which the material is heated is a significant consideration in the efficiency and effectiveness of the overall process. In ultraviolet, infrared, hot air, hot liquid, and flame heating methods, or other examples where external heat sources are used, it is often difficult to obtain uniform heat distribution in the material through to its center. In instances where the center of the material is not adequately heated, its transition from the initial state may not fully or uniformly occur. Alternatively, in order to obtain the desired temperature at the center of the article, excessive heat may be required to be applied at the surface whereby such excessive temperature conditions can lead to degradation of the material surface. Additionally, the extended time required to apply heat to accomplish the transition to the desired state diminishes the cost-effectiveness of the system. In cases where thermally conductive fillers are used in the material to improve the heat transfer from the surface of the material to its center, large amounts of filler that may adversely affect the properties of the host material are necessary for a smooth temperature gradient.

Because of these disadvantages of external heating, bulk, or internal heating methods are preferred to provide fast, uniform, and efficient heating.

In contrast to the external heating methods discussed above, electromagnetic heating techniques, such as microwave, dielectric and magnetic induction, all provide internal heating of non-conductive articles, such as polymeric heat recoverable articles, gels, adhesives, foams, inks and ceramics. The electromagnetic energy is indirectly coupled to the material and heat is generated uniformly within the bulk of the material.

Both microwave and dielectric heating techniques are based primarily on the heat generated in the dielectric material by the "rattling" of electric dipoles as they try to align with a rapidly alternating applied electric field. Microwave heating requires exposure to fields at frequencies in the high Megahertz or Gigahertz range where water dipoles resonate. The presence of water on the surface of a dielectric material to be heated with microwaves may result in non-uniform heating of the material. Dielectric heating employs frequencies from about 27 MHz to high Megahertz where the electric dipoles of most dielectrics resonate. The dielectric material being heated in this fashion does not have an inherent temperature control; the oscillating electric dipoles continue to generate heat, thereby causing degradation of the material when the heating is excessive.

Magnetic induction heating employs alternating magnetic fields such as those produced in an induction coil to couple with a work piece situated inside the coil. A magnetic or electrically conductive material can couple with the applied field and thereby transform the coupled electromagnetic energy into thermal energy. A non-magnetic and electrically non-conductive material is transparent to the magnetic field and therefore cannot couple with the field to generate heat. However, such a material may be heated by magnetic induction heating by uniformly distributing ferromagnetic particles within the material and exposing the article to an alternating high frequency electromagnetic field. Small sized ferromagnetic particles are efficient heat generators when exposed to alternating fields of frequency from about 100 kHz to about 50 MHz.

Materials suitable for induction heating include ferromagnetic and ferrimagnetic materials. In this application, we use the definition of ferromagnetic and ferrimagnetic materials as set forth in a publication by R. M. Bozorth entitled "Ferromagnetism", Bell Telephone Laboratories, Inc. D. Van Nostrand Company, Inc., 1951, which is hereby incorporated by reference for all purposes. Ferrimagnetic materials, or ferrites, are a subgroup of ferromagnetic materials. A detailed analysis of ferrimagnetism is set forth by Smit and Wijn in "Ferrites", John Wiley & Son. 1959, which is hereby incorporated by reference for all purposes. Ferrimagnetic materials usually exhibit very low electrical conductivity compared to ferromagnetic metals and metal alloys.

Ferromagnetic materials such as iron, nickel, cobalt, iron alloys, nickel alloys, cobalt alloys, permalloy, and several steels, and ferrimagnetic materials such as magnetite, nickel-zinc ferrite, manganese-zinc ferrite, and copper-zinc ferrite are all suitable as heat generating particles dispersed in a non-magnetic, electrically non-conductive host material exposed to a high frequency alternating magnetic field. Though electrically conductive, non-magnetic metals such as copper, aluminum and brass may be used in the form of particles to produce heat, they are less efficient than magnetic materials and are therefore not preferred.

Ferromagnetic materials generate heat primarily due to combination of induced eddy currents and magnetic hysteresis losses.

Alternating magnetic fields induce eddy currents in particles comprising electrically conductive material. These internally circulating currents can produce heat within a particle. The majority of the induced eddy currents are confined within a distance $\delta$ from the surface of the particle given by the formula:

$$\delta = (2/\omega\sigma\mu_r)^{\frac{1}{2}}$$

where $\sigma$ is the electrical conductivity of the particle in $ohm^{-1}\text{-}m^{-1}$, $\omega$ is the angular frequency of the applied field in $sec^{-1}$, and $\mu_r$ is the magnetic permeability of the particle relative to air. This distance $\delta$ is defined as the particle "skin depth" when the particle is exposed to an alternating magnetic field. At a distance $\delta$ the current density has dropped to $1/e$, or about 37% of its value at the surface. Therefore, a particle comprising a ferromagnetic material of electrical conductivity $\sigma$ and relative magnetic permeability $\mu_r$ exposed to an alternating electromagnetic field of frequency $\omega$, has a skin depth defined by the above equation.

Electrically conductive ferromagnetic particles of a size several times larger than the particle skin depth may be efficient generators of heat from eddy currents. Small skin depth may be achieved with particles of high magnetic permeability and high electrical conductivity exposed to a magnetic field of high frequency. For example, nickel with an electrical conductivity of $1.3 \times 10^7$ ohm$^{-1}$-m$^{-1}$, a relative permeability of 100 ($\mu_r = 100 \times 4\pi \times 10^{-7}$ Wb/A-m) exposed to a field of frequency 5 MHz ($\omega = 2\pi f = 2\pi \times 5 \times 10^6$ sec$^{-1}$) gives a skin depth of 6.2 µm. Thus, about 37% of the induced current density will be confined in a region of the particle 6.2 µm from the surface of the particle. The magnitude of the induced current density increases with the size of the eddy current loop and hence with the size of the particle.

Eddy current losses are negligible in electrically less conductive particles due to the large skin depth of such particles. For example, a manganese-zinc ferrite, such as ferrite Mn-67 from Ceramic Magnetics, with an electrical conductivity of 0.67 1 ohm$^{-1}$-m$^{-1}$, and a relative magnetic permeability of 4000 exposed to a field of frequency 5 MHz has a skin depth of 435 µm and particles greater than about a millimeter are necessary for the generation of eddy current losses. Such large particles will adversely alter the properties of the host material and are, hence, undesirable. Similarly, an electrically non-conductive nickel-zinc ferrite, such as CMD 5005 from Ceramic Magnetics, with an electrical conductivity of $1.0 \times 10^{-7}$ ohm$^{-1}$-m$^{-1}$, a relative permeability of 3000 exposed to a field of frequency 5 MHz has a skin depth of $1.3 \times 10^7$ µm or 13 m.

Electrically non-conductive ferrimagnetic particles such as ferrite particles, or electrically conductive ferromagnetic particles that have all three dimensions smaller than the skin depth heat up primarily due to magnetic hysteresis losses. The magnetic dipoles within each magnetic domain of the particle tend to align with the rapidly alternating magnetic field thereby resulting in domain wall movement. If the alignment of the dipoles is not in phase with the field, the alignment lags the field and follows a hysteresis loop. The hysteresis loop represents the response of the ferromagnetic material to an applied magnetic field and its size and shape depend on the properties of the ferromagnetic material and on the strength of the applied field. The area enclosed by the hysteresis loop represents the work required to take the material through the hysteresis cycle. When this cycle is repeated, dissipative processes within the material due to realignment of the magnetic domains result in a transformation of the magnetic energy into internal thermal energy which raises the temperature of the material. Hysteresis losses do not depend on the particle size as long as the particle size is equal to at least one magnetic domain.

The amount of heat generated by particles dispersed in an electrically non-conductive, non-magnetic host material depends on several parameters including the following equipment and particle parameters:

Equipment parameters:
Coil size and geometry
Coil current frequency
Coil current amplitude (power)
Coil efficiency
Particle parameters:
Magnetic permeability
Electrical conductivity
Size and shape of hysteresis loop
Particle volume fraction in the host material
Geometry
Size
Alignment with the field and with each other
Proximity to coil For a given frequency, power, and coil size and geometry, faster heating of the host material containing the ferromagnetic particles may be obtained by carefully selecting the particle properties. Particles of the present invention are highly efficient in that they provide fast heating at low particle volume fractions in the host material, thereby having no adverse effect on the host material properties.

When a magnetic particle reaches or exceeds a critical temperature, referred to as the Curie temperature, or Curie point, its magnetic permeability drops precipitously to a value approaching 1. The particle then loses much of its ability to respond to a magnetic field and heating is significantly diminished. When the temperature of the particle drops below the Curie point, the particle regains its magnetic properties and heating resumes. Therefore, when the temperature of the particle is less than the Curie point, the particle heats. When the temperature of the particle is greater than the Curie point, the particle essentially stops increasing in temperature. Therefore, the particle autoregulates. Thus, the Curie point is a practical autoregulation means for preventing the host material from being overheated.

It is known to intersperse particles in a polymeric material which are heated by induction. Examples can be found in U.S. Pat. Nos. 3,620,875; 3,391,846; 3,551,223; 3,620,876; 3,709,775; 3,902,940; 3,941,6411. 4,000,760; 4,918,754; and 5,123,989; 5,126,521; PCT International Publication WO 90/03090, Defensive Publication T905,001 published Dec. 19, 1972 by E. I. du Pont de Nemours and Company; Japanese Patent Applications S(56) (1981)—55474; S64 (1989) 4331; and H3 (1991)—45683; and Swedish Patent Specification 224,547, which are all hereby incorporated by reference for all purposes.

Attempts have been made to provide regulation of the temperature of the host material by selecting particles with a Curie point equal to or slightly greater than the temperature to which the article is to be heated. Examples include U.S. Pat. Nos. 2,393,541; 3,551,223; 4,555,422; 4,699,743 and 5,126,521, and PCT International Publication WO 91/11082, which are all hereby incorporated by reference for all purposes.

Uniform dispersion of the particles throughout the bulk of the material facilitates uniform heating. In this way, induction heating also allows selective and controlled heating. Selective heating can result where the particles are placed in higher concentrations in areas to be heated to a relatively greater extent. Additionally, the temperature of articles loaded with ferromagnetic particles and heated by induction heating may be controlled by utilization of particles having a Curie point near the desired temperature.

SUMMARY OF THE INVENTION

With induction heating, it is possible to heat an electrically non-conductive material in situ quickly, uniformly, selectively and in a controlled fashion. Particles for induction heating are added to the electrically non-conductive, non-magnetic host material and exposed to high frequency alternating electromagnetic fields such as those produced in an induction coil. Selection of the particles according to the present invention results in faster, more uniform and more controlled heating. These particles advantageously have the configuration of a flake, i.e., a thin disk-like configuration. Heat-generating efficiency of these particles permits a smaller percentage volume of particles in the host material such that the desired properties of the host material, remain essentially unchanged. Additionally, temperature regulation is possible to prevent overheating of the host material.

In one aspect, the invention provides a heat generating article, for use in an alternating magnetic field, such as that produced by an induction coil, said article comprising a non-magnetic, electrically non-conductive host material in which particles are dispersed, said particles comprising ferromagnetic material having both high magnetic permeability and high electrical conductivity, said particles having a skin depth and a configuration including first, second and third orthogonal dimensions, wherein;

said first and second orthogonal dimensions are greater than the skin depth of the particle; and said first and second orthogonal dimensions are at least 5 times said third orthogonal dimension.

The first and second orthogonal dimensions of the particle which are the larger of the dimensions, are each preferably between about 1 μm and about 300 μm.

The ferromagnetic material comprises a metal or metal alloy. Examples of the preferred ferromagnetic material include nickel or nickel alloys, such as a nickel aluminum alloy. The configuration of the nickel particles preferably comprises a nickel flake.

The percentage of particles interspersed in the host material is preferably between about 0.1% and about 50% by volume, more preferably between about 0.5% and about 10%, and especially less than about 5% by volume, such that the properties of the host materials are essentially unchanged. The host material is electrically non-conductive and non-magnetic, such as a polymer or a ceramic.

In a preferred embodiment, the ferromagnetic particles have an electrical conductivity of greater than about $10^6$ ohm$^{-1}$m$^{-1}$. The preferred initial magnetic permeability of the particles relative to air is greater than about 70.

The ferromagnetic material has a Curie temperature at least about equal to the temperature to which said article is to be heated.

The particle may be comprised of a homogeneous material, or may be comprised of a central carrier portion and a coating. The carrier material may be any of a number of magnetic or non-magnetic materials. Additionally, the carrier material may be any of a number of electrically conductive or non-conductive materials. The coating is preferably of a highly magnetic, highly electrically conductive material, such as the ferromagnetic materials described above. Alternatively, when the central carrier portion comprises a highly magnetic, highly electrically non-conductive material and generates heat, the coating may be non-magnetic and/or electrically non-conductive, such as an oxide layer to prevent oxidation of the central carrier portion, or a coupling agent to aid admixing of the particles with the host material.

The article may undergo a change in shape, volume, or viscosity upon heating. For example, the article may be a heat recoverable article, a foam, an adhesive or a gel. In each of these examples, the Curie temperature of the ferromagnetic material will be equal to at least about the temperature at which the materials is to be heated. The host material may also be a fusible material having a melt temperature $T_m$. In this case, the Curie temperature is preferably at least about the melt temperature of the host material.

The article may be oriented such that an axis parallel to the greatest dimension of the article is disposed generally parallel with respect to the magnetic field lines generated by the coil.

In another aspect of the invention, the invention provides an arrangement for forming a block in an optic or electric cable against transmission of fluid along the cable comprising:

a heat activatable blocking construction positioned in proximity to the wires of the cable, said blocking construction comprising a host material in which particles are dispersed, said particles comprising ferromagnetic material having high magnetic permeability and high electrical conductivity, said particles having a skin depth and a configuration including first, second and third orthogonal dimensions, wherein said first and second orthogonal dimensions are greater than the skin depth of the particle and said first and second orthogonal dimensions are at least about 5 times said third orthogonal dimension; and a cover disposed around said blocking construction.

The blocking construction may include a plurality of openings for receiving the wires.

The cover may comprise a host material in which ferromagnetic particles are dispersed, said particles comprising ferromagnetic material having high magnetic permeability and high electrical conductivity, said particles having a skin depth and a configuration including first, second and third orthogonal dimensions, wherein said first and second orthogonal dimensions are greater than the skin depth of the particle and wherein said first and second orthogonal dimensions are at least 5 times said third orthogonal dimension.

The cover may advantageously comprise an inner layer and an outer, preferably heat recoverable, layer. The inner layer comprises a host material in which ferromagnetic particles are dispersed, said particles comprising ferromagnetic material having high magnetic permeability and high electrical conductivity, said particles having a skin depth and a configuration including first, second and third orthogonal dimensions, wherein said first and second orthogonal dimensions are greater than the skin depth of the particle and wherein said first and second orthogonal dimensions are at least 5 times said third orthogonal dimension.

The host material may advantageously comprise a fusible polymeric sealant or adhesive.

Other features and advantages of the present invention will appear from the following description in which the preferred embodiment has been set forth in detail in conjunction with the accompanying drawings.

BRIEF DESCRIPTION OF THE DRAWINGS

FIG. 1 is a cross-sectional view of flake particles interspersed within a host material.

FIG. 2A is a perspective view of an arrangement for forming a fluid block.

FIG. 2B is a cross-sectional view of the embodiment of FIG. 2A after installation.

FIG. 3 is a Temperature-Time curve illustrating the effect of temperature regulation.

DETAILED DESCRIPTION OF THE PREFERRED EMBODIMENT

The present invention comprises an article for use in high frequency alternating magnetic fields where heat is generated to thereby transform the article to a different state or configuration. The article comprises a host material including ferromagnetic particles dispersed therein. The host material is electrically non-conductive, and non-magnetic and may be a polymeric heat recoverable article, a gel, an adhesive, a foam, an ink or a ceramic. In each of these cases, the article is heated to transform the article from its initial state to a new condition. In the present invention, induction heat is produced internally by subjecting the article to alternating magnetic fields at high frequencies between about 100 kHz and about 50 MHz and preferably between about 450 kHz and about 10 MHz. Selection of particles to be interspersed in the host material is the key to providing an efficient, autoregulating heating article that heats quickly, internally, uniformly and selectively.

A primary object of the present invention is to provide particles which are particularly fast heating in comparison to the prior art. The prior art has utilized large sized metallic spheres or fibers for induction heating.

The shape of small ferromagnetic particles is normally somewhat irregular. Nevertheless, for purposes of the present invention, their general configuration can be approximated by more precise geometric shapes and defined by three mutually perpendicular or orthogonal dimensions, x, y, and z. Each particle has its own set of axes in which one of the orthogonal axes is oriented parallel to the smallest dimension of the particle. The particles may be of any shape: spherical in which all dimensions, x, y and z are equal; rod-like fibers wherein x and y are substantially equal and wherein z is substantially greater than x and y; disk-like flakes in which x and y are approximately the same order of magnitude, and represent generally the length and width of the particle and wherein z represents the smallest dimension and refers generally to the particle thickness. The aspect ratio of the flake is defined as the major dimension, x or y, divided by the minor dimension, z. In the present invention, flake particles are the preferred embodiment. Referring to FIG. 1, flake particles 4 are interspersed within a host material 6. The two larger dimensions, x and y, are each between about 1 µm and about 300 µm. These two dimensions are each also at least about 5 times the value of the smallest dimension. For purposes of illustration, for particle 4', discussed below, x' and y' are approximately equal to each other. The dimensions of particle 4' are as follows: $x'=y'=d$ and $z'=t$. The value of d is referred to as the diameter of the disk-like flake and t is its thickness.

The particles of the present invention heat quickly because they generate heat by both eddy currents and hysteresis losses, as described above.

In the case of hysteresis heating, the size, shape and orientation of the particles in the magnetic field are not critical to the rate of heat generation. However, the preferred orientation of the article containing the particles relative to the direction of the field lines enhances the field strength. For example, spherical particles randomly dispersed inside a polymer rod heat faster when the rod is oriented with its major axis parallel to the field lines than when the axis is normal to the field lines. This increased heating is due to the flux concentration effect that each sphere has on its adjacent spheres along the flux lines with the spheres at the end of the rod benefitting from the cumulative flux concentration effect of a number of spheres that lie before it. When the rod is oriented with its major axis normal to the field lines, each field line penetrates only a small number of spheres, the flux concentration effect is reduced and the rate of heat generation is also reduced. For example, ferrite Mn-67 spheres were mixed at 5% by volume in low density polyethylene. Extruded rods 7 mm in length by 1 mm in diameter were positioned in a cylindrical induction coil at 5 MHz where it was found that the rods positioned with their major axis parallel to the field lines heated about twice as fast as the rods positioned normal to the field lines.

The particles according to the present invention heat faster than the particles mentioned in the prior art because in addition to hysteresis losses they also generate heat due to eddy current losses. This is because they are electrically conductive and also because, for a given desired particle volume and particle surface area, at a particular frequency, they have two orthogonal dimensions greater than the skin depth such that the flow of eddy currents is possible. Fibers, on the other hand, have only one dimension greater than the skin depth and spheres have none of the three dimensions greater than the skin depth. In these latter cases, eddy current losses and hence heating rate and efficiency is greatly reduced.

I have discovered that the ratio of particle surface area to particle volume aids in obtaining rapid uniform heating of the article. One important consideration is that of heat transfer from the ferromagnetic particle to the surrounding host material. Particles having relatively high surface area per unit volume are able to more readily conduct heat to the surrounding host material. Surface area-to-volume ratio varies with particle shape. A comparison of a sphere, a fiber and a flake shows dramatic differences in the ratio S/V, for a given particle volume.

For a sphere of diameter d, $S/V = 6/d.$

For a fiber having a cylindrical cross section of diameter d and a length l, $S/V = 2/l + 4/d.$ For a disk-like flake, where d is the diameter and t is the thickness, $S/V = 4/d + 2/t.$ Flux concentration between particles is improved with high surface area-to-volume ratio particles, such as flakes, compared to fibers and spheres for a given volume of particles. To obtain large surface area-to-volume ratio with spherical particles or fibers, small particle size is necessary, much smaller than the skin depth and therefore, they will not generate heat due to eddy currents. For example, a magnetic stainless steel flake with two orthogonal dimensions equal to about 15 µm, and a third orthogonal dimension, or thickness, of about 0.2 µm, has a surface area-to-volume ratio, $S/V = 4/d + 2/t$, $S/V = 4/15 \ \mu m^{-1} + 2/0.2 \ \mu m^{-1} = 10.3 \ \mu m^{-1}$. At an assumed skin depth of 7 µm, these flakes have two dimensions greater than twice the skin depth and will therefore heat up due to eddy currents in addition to the hysteresis losses when exposed to an alternating magnetic field. A magnetic stainless steel sphere having the same surface area-to-volume ratio, $S/V = 6/d = 10.3$ $\mu m^{-1}$, has a diameter of 0.58 $\mu m$, much smaller than the skin depth, and therefore will not generate significant heat due to eddy currents. Similarly, a magnetic stainless steel fiber having the same surface area-to-volume ratio, $S/V = 4/d + 2/l = 10.3$ $\mu m^{-1}$, may have only one dimension greater than twice the skin depth. The smallest length that the fiber can have is twice the skin depth or 14 $\mu m$ which gives a fiber diameter of 0.4 $\mu m$. Alternatively, if the fiber length is greater than 14 $\mu m$, the fiber diameter must be less than 0.4 $\mu m$. Thus, the fiber has only one dimension greater than twice the skin depth and, therefore, will not generate significant heat due to eddy current losses. For example, magnetic stainless steel fibers, 6 $\mu m$ in diameter and 1000 $\mu m$ long, supplied by Memcor Corporation, were added at 2% by volume to low density polyethylene. The loaded polyethylene rods were exposed to an alternating magnetic field at 5 MHz and coil current of about 20 amperes rms, where it was observed that the heating rate was about 10 times slower than that of the larger, 20 $\mu m$ in diameter and 1000 $\mu m$ long, magnetic stainless steel fibers also supplied by Memcor Corporation.

Use of particles having two orthogonal dimensions larger than the third orthogonal dimension, such as flakes, also allows the particles at the surface of the article to align with the surface of the article during shearing, as for example, during the extrusion and expansion of heat shrink tubing loaded with flakes. For example, at a volume fraction of 2%, processing of the article containing flakes results in a smooth, opaque surface with uniform color. At that same volume fraction of fibers, the surface is not smooth and individual fibers can be easily detected visually. This is because flakes of the preferred embodiment have a greater surface area per given particle volume than spheres or fibers. Additionally, orientation of the particles within the article and relative to the magnetic flux lines is expected to have some effect on the heating rate. To enhance this effect, increased alignment of the particles relative to each other within the article may be obtained by exposing such particles to strong permanent magnetic fields.

It is desired that an article in accordance with the present invention remains electrically non-conductive, as is the host material of the article, even after addition of electrically conductive particles. Because of the highly efficient heat generating nature of the particles employed in the present invention, it is possible to use a low volume fraction of particles, thereby maintaining the non-conductive nature of the article. An additional benefit of using a low volume fraction of particles is lowered costs, based upon a smaller mass of particles required for inclusion in the article.

As discussed above, the particle Curie point may be used to control the temperature of the particle and thereby the temperature of the article. It is possible to select different particles having different Curie points and also maintain high particle electrical conductivity and magnetic permeability. The rapidly heating particles of the present invention raise in temperature to their Curie point extremely fast at which point the particles autoregulate. Therefore it is possible with the particles of the present invention to achieve extremely fast heating and also extremely precise temperature regulation. With the present particles it is possible to autoregulate both the heat generated by eddy currents and hysteresis losses, an improvement over the prior art. According to the present invention, materials for inclusion into the host material may be selected based upon their Curie points and made into particles having high aspect ratios and high surface area-to-volume ratios. The selected material has a Curie temperature equal to or greater than the temperature to which the article is to be heated. In this way, heating of the article may be closely controlled, while heating remains rapid. It is still possible to accomplish this with a low volume fraction of particles, thereby maintaining the properties of the host material.

Because of the higher efficiency of the present invention, less power is necessary to achieve transition to the final, desired, state of the article. Therefore, application equipment required to heat an article constructed in accordance with the present invention is less expensive, may be compact, lightweight, portable, or even hand held, and may not require shielding of stray radiation.

The preferred particles of the present invention are ferromagnetic particles, having high electrical conductivity and high magnetic permeability. Magnetic permeability as used herein, refers to the initial magnetic permeability as defined in detail on page 6 in Bozorth, referred to above. Appendix 4 of Bozorth illustrates initial permeabilities relative to air for several ferromagnetic materials. As used in this application, high magnetic permeability is defined as an initial magnetic permeability relative to air of greater than about 20, preferably greater than about 70, and more preferably greater than about 100. As used in this application, high electrically conductivity is defined as an electrical conductivity having a value of greater than about $10^4$ ohm$^{-1}$m$^{-1}$, and preferably more than about $10^6$ ohm$^{-1}$m$^{-1}$, and most preferably greater than about $10^7$ ohm$^{-1}$m$^{-1}$.

Suitable ferromagnetic materials for use in the current invention include nickel, iron, cobalt, some nickel alloys, some iron alloys, some cobalt alloys, steel, permalloy or supermalloy. Preferred materials have high electrical conductivity, high magnetic permeability and Curie point at least about equal to the temperature to which the article is to be heated. These include binary nickel alloys comprising only a small percentage of another element such as aluminum, copper, and chromium to lower the Curie point. The Curie points of binary alloys of cobalt and iron including only a small percentage of another element are generally much higher than the Curie points of the binary nickel alloys containing the same elements. Nickel alloys, including multiple elements may be made to have extremely high magnetic permeabilities and still maintain high electrical conductivity. For example, supermalloy, an alloy containing nickel, molybdenum, iron and manganese, may have an initial relative permeability of 100,000, an electrical conductivity of $1.67 \times 10^6$ ohm$^{-1}$m$^{-1}$, and a Curie point of 400° C.

The magnetic, electrically conductive particles of the present invention may include a coating. The coating may be non-magnetic, and electrically non-conductive such as coupling agents to facilitate homogeneous admixing of the particles with the host material. Alternatively, the coating may be a magnetic, electrically non-conductive material, such as a ferrite, to maintain the magnetic properties of the particle/coating system and provide the particle with an electrically non-conductive surface such that oxidation of the surface is avoided.

Oxidation may also be avoided when the coating is an oxide.

It should also be noted that the particles of the present invention may consist of a central carrier portion, or core, and a surface layer, or coating. The central carrier portion may be magnetic and electrically non-conductive, such as a ferrite; it may be non-magnetic and electrically conductive such as copper or aluminum; or it may be non-magnetic and electrically non-conductive such as mica, graphite, a polymer, a glass, or a ceramic. The coating is preferably highly magnetic and highly electrically conductive. The coated particle may also include a further coating, as discussed above, to avoid oxidation of the particle surface or to improve mixing with the host polymer.

It is desirable to maintain a low volume fraction of particles in the host material to preserve the properties of the host material. This volume fraction is preferably between about 0.1% and 50%, more preferably between about 0.5% and about 10%, and most preferably equal to about 2% by volume. Articles loaded with particle percentages above 15% are generally not preferred, and, in fact, are achievable only by using particles having relatively lower aspect ratios. By using smaller particle volume fractions, the host material properties are not adversely affected. Thus, the mechanical and electrical properties of the host material are essentially unchanged.

For improved heating rate, the article may include flux concentrating particles interspersed with the heat-generating ferromagnetic particles, as described in PCT International Publication WO91/11082, Jul. 25, 1991, entitled "System for Producing Heat in Alternating Magnetic Fields" by Metcal, which is hereby incorporated by reference for all purposes. The flux concentrating particles are preferably more highly magnetic than the heat-generating ferromagnetic particles so as to concentrate the magnetic flux lines to the heat-generating particles. The flux concentrating particles are ferromagnetic, can be non-heat-generating, or, alternatively, can be less heat-generating than the heat-generating particles. The Curie temperature of the flux concentrating particles may be different from the Curie temperature of the heat-generating particles.

Although the preferred embodiment is directed to interspersing highly magnetic and highly electrically conductive ferromagnetic particles of the preferred flake-like configuration into a host material which is heat activatable so as to inductively heat the host material, it is within the scope of the present invention to select particles having high surface area-to-volume ratio with beneficial effects on uniform heat transfer throughout the host material. Particles having high aspect ratio and surface area-to-volume ratio that are within the scope of this invention include ferrite flakes, ferrite fibers, or high aspect ratio and high surface area-to-volume ratio mica and/or graphite particles coated with ferrite.

The present invention may be employed in any application using a heat activated material, such as a "Blocking Arrangement for Suppressing Fluid Transmission in Cables" as described in U.S. Pat. No. 4,972,042, to Seabourne et al. and assigned to Raychem Limited, or "Cable Sleeve with a Device Cross-Shaped in Cross-Section for Support of Cable Ends Entering the Cable Sleeves" as described in U.S. Pat. No. 4,693,767 to Grzanna et al. and assigned to Walter Rose GmbH & Co., which are both hereby incorporated by reference for all purposes.

Referring now to FIGS. 2A and 2B, a cable blocking assembly 8 comprises a generally flat body construction 10 having five open-ended passageways 12 extending therethrough. Each passageway 12 has associated with it a slot 14 which enables an electrical wire 16 to be inserted into passageway 12 simply by positioning the wire along slot 14 and pressing the wire into the passageway. It is possible for any number of wires to be inserted into each passageway, depending on the relative dimensions of the wires and passageways. As shown in FIG. 2A, all slots 14 are located on the same side of construction 10. Although body construction 10 is illustrated as being a flat body, any type of body construction which may be disposed in proximity to the wires, either surrounding the wires of the wire bundle or positioned within the wire bundle, or any construction including openings for receiving the wires, is within the scope of the present invention.

Heat shrinkable coverings, either in the form of a sleeve 18 that had previously been positioned on construction 10, or in the form of a tape 20, is applied onto the blocking construction 10 and also onto the adjacent regions of the wires.

Blocking construction 10 is heat activatable and preferably constructed having a host material including ferromagnetic particles dispersed therein, as described above. Cover 18 or 20 may also be constructed in accordance with the present invention by incorporating ferromagnetic particles within a host material.

The assembly is heated by induction heating to form the completed cable block as shown in FIG. 2B. Body construction 10 is capable of being activated by heat, and transforms into resolidified sealant 22. For example, construction 10 may be a fusible polymeric sealant. In the resulting cable block, wires 16 are completely encapsulated in fused and resolidified sealant 22, and wires 16 and sealant 22 are enclosed in the heat recoverable sleeve 18 or tape 20.

Additionally, cover 18 or 20 may include an outer layer and an inner layer, wherein the inner layer comprises a host material including ferromagnetic particles dispersed therein, as described above. The outer layer may be heat recoverable.

Other applications may include activation of foaming agents whereby the volume of the article increases; curing of thermoset adhesives or gels, or melting of thermoplastic adhesives, whereby the viscosity of the article changes; or heat recoverable articles, whereby the shape of the article changes.

EXAMPLE 1

Heating Rates

To demonstrate the faster heating obtained with the particles of the present invention compared to those used in the prior art, particles of various geometries, sizes, electrical conductivities, and magnetic properties were mixed at 5% by volume with a host material comprising low density polyethylene. The articles thus prepared were formed into rods of diameter 7.9 mm and length 58 mm. Particle orientation was mostly random throughout the rod with some alignment near the walls observed with flakes and fibers. The volume resistivity and dielectric strength of the loaded rods remained substantially unchanged, being essentially equal to the volume resistivity and dielectric strength of the host material. The rods were inserted into a 14-turn solenoidal induction coil of diameter of 11.2 mm and length 73.0 mm operated at 4 MHz with a 30 amperes rms current. The particles exposed to this electromagnetic field coupled to the field to generate heat thereby raising the temperature of the article. The temperature of the article was measured with an infrared pyrometer positioned 6 mm away from the surface of the article. The Temperature-Time curves were plotted on a chart recorder attached to the pyrometer. The heating rates were calculated as the temperature increase over time in an 8-second interval.

In Table I, the article heating rates in °C./sec are listed together with the particle major and minor dimensions, aspect ratio, and surface area-to-volume ratio for several particles tested. The particles were assumed to be defined by precise geometric shapes. Flakes were assumed to have a disk-like geometry with the diameter of the disk as the major dimension and the thickness of the disk as the minor dimension. The aspect ratio of the flake is thereby defined as the major dimension divided by the minor dimension. The flake surface area-to-volume ratio is defined as $S/V = 2/t + 4/d$ where t is the minor dimension, or the thickness, and d is the major dimension, or the diameter. Fibers were assumed to have a rod-like geometry with the length of the rod as the major dimension and the diameter of the rod as the minor dimension. The aspect ratio of the fiber is thereby defined as the major dimension divided by the minor dimension. The fiber surface area-to-volume ratio is defined as $S/V = 2/l + 4/d$ where l is the major dimension, or the length, and d is the minor dimension, or the diameter. Powders or sphere-like particles have an aspect ratio of 1 because all dimensions are about equal. The surface area-to-volume ratio is defined as $S/V = 6/d$ where d is the diameter of the sphere.

these fibers made the surface of the article rough, and adversely altered some of the properties of the host material including its elongation and tensile modulus. The flakes, however, included in the present invention, maintained a very smooth article surface, and also maintained the elongation and tensile modulus of the host material.

The results shown in Table I also demonstrate the effect of particle size on the heating rate. Particles #1, nickel flakes 30 μm × 0.4 μm, heated much faster than particles #9, nickel flakes 25 μm × 1.1 μm, due to their greater diameter and greater surface area per unit volume. Additionally, the large 120 μm nickel spheres, #11, heated faster than the small 5 μm nickel spheres, #19, because their diameter is much greater than the 7.0 μm skin depth of nickel particles at 4 MHz. The 5 μm nickel spheres are therefore too small to generate substantial heat from eddy current losses and they hence primarily heat due to hysteresis losses. Hysteresis losses do not depend on the particle size and therefore the heat generated due to hysteresis losses is about the same for nickel flakes, fibers and spheres. The much faster heating rates observed with large nickel spheres, fibers and flakes compared to the 5 μm nickel spheres are therefore primarily due to eddy current losses.

Aluminum spheres of diameter 75 μm, #21, heat much more slowly than the 120 μm nickel spheres, #11, and the smaller 5 μm nickel spheres, #19, demonstrating the effect of high magnetic permeability on the heating rate. Aluminum does not heat fast because it is not magnetic (Aluminum, $\mu_r = 1$; Nickel, $\mu_r = 100$). Moreover, aluminum flakes, #22, also heated very slowly compared to nickel flakes, #1 and #9, due to the non-magnetic nature of aluminum.

Permalloy, #5, Metglas, #6, and magnetic stainless steel flakes, #4, #7 and #8, though more magnetic than

TABLE I

| Particle | Major Dimension (μm) | Minor Dimension (μm) | Aspect Ratio | Surface Area-to-Volume ($\mu m^{-1}$) | Heat Rate (°C./sec) |
|---|---|---|---|---|---|
| 1 Nickel flakes | 30 | 0.4 | 75 | 5.1 | 41.5 |
| 2 Nickel fibers | 1000 | 60 | 16.7 | 0.1 | 28 |
| 3 Nickel fibers | 500 | 50 | 10 | 0.1 | 27.5 |
| 4 Stainless steel 410 flakes | 80 | 2 | 40 | 1.1 | 27 |
| 5 Permalloy 2-81 flakes | 80 | 2 | 40 | 1.1 | 23 |
| 6 Metglas 2605SC flakes | 1000 | 17 | 58.8 | 0.1 | 20 |
| 7 Stainless steel 316 flakes | 75 | 1.2 | 62.5 | 1.7 | 16 |
| 8 Stainless steel 316 flakes | 30 | 0.5 | 60 | 4.1 | 16 |
| 9 Nickel flakes | 25 | 1.1 | 22.7 | 2.0 | 14 |
| 10 Cast iron powder | 30 | 30 | 1 | 0.2 | 8 |
| 11 Nickel spheres | 120 | 120 | 1 | 0.1 | 7 |
| 12 Iron 50/Nickel 50 powder | 75 | 75 | 1 | 0.1 | 5 |
| 13 Alnico powder | 120 | 120 | 1 | 0.1 | 5 |
| 14 Magnetite spheres | 20 | 20 | 1 | 0.3 | 4 |
| 15 Cobalt-Samarium powder | 75 | 75 | 1 | 0.1 | 4 |
| 16 Mn—Zn Ferrite FLN spheres | 15 | 15 | 1 | 0.4 | 4 |
| 17 Ni—Zn Ferrite CMD5005 spheres | 15 | 15 | 1 | 0.4 | 2.5 |
| 18 Mn—Zn Ferrite Mn-67 spheres | 15 | 15 | 1 | 0.4 | 1.5 |
| 19 Nickel spheres | 5 | 5 | 1 | 1.2 | 1 |
| 20 Iron silicide powder | 20 | 20 | 1 | 0.3 | 1 |
| 21 Aluminum spheres | 75 | 75 | 1 | 0.1 | 0.7 |
| 22 Aluminum flakes | 40 | 0.5 | 80 | 4.1 | 0.1 |

The heating rates shown in Table I demonstrate the much improved heating rates obtained with the particles of the present invention. Particles #1 through #9 have high electrical conductivity, high initial permeability and high aspect ratio. The nickel fibers, particles #2 and #3, heated very fast because they have all three dimensions greater than the skin depth of nickel particles which is approximately equal to 7.0 μm at 4 MHz and an assumed relative permeability of 100. However, nickel, did not heat up as fast as the high surface area-to-volume nickel flakes, #1, because of the higher electrical conductivity and the higher S/V of nickel flakes #1.

The results in Table I also demonstrate that the ferrite particles, #14 and #16–18, do not heat as fast as the particles of the current invention.

EXAMPLE 2

Temperature Regulation

Two sets of rods of diameter 7.9 mm and length 58 mm comprising a host material of a thermoplastic polyamide adhesive and 2% by volume of ferromagnetic flakes were prepared. The first set comprised nickel flakes 30 μm33 0.4 μm, particles #1 in Table I, and the second set of nickel aluminum alloy flakes 40 μm×0.5 μm where the weight percentage of nickel in the alloy was about 97% and the weight percentage of aluminum was about 3%. The rods were placed inside the coil of Example 1 operating at 5 MHz with a coil current of 30 amperes rms. Temperature-Time curves were obtained as described in Example 1. FIG. 3 shows the Temperature-Time curves. The rods comprising nickel flakes reached 200° C. in 10 seconds at which temperature the adhesive was greatly overheated. The rods comprising nickel aluminum alloy flakes heated somewhat faster but autoregulated at 140° C. at which temperature the adhesive exhibited the desired viscosity. This temperature was maintained for about 55 seconds.

EXAMPLE 3

Article Orientation

To demonstrate the effect of article orientation relative to the magnetic field lines on the heating rate, three samples were prepared and positioned such that the longest dimension of the article was either parallel or perpendicular to the field lines.

Sample 1: A host material of low density polyethylene was mixed with nickel flakes, 30 μm×0.4 μm, particles #1 in Table I, at 2% by volume and extruded to form rods of diameter 1.0 mm and length 7 mm.

Sample 2: A host material of a thermoplastic polyamide adhesive was mixed with nickel fibers, 50 μm×500 μm, particles #3 in Table I, at 5% by volume and extruded into sleeves of length 7.0 mm, inner diameter 12.2 mm and wall thickness 0.3 mm. An alignment of the fibers was observed parallel to each other and parallel to the walls of the sleeve.

Sample 3: A host material of low density polyethylene comprised of 2% by volume nickel flakes, 30 μm×0.4 μm, particles #1 in Table I, was extruded, irradiated and expanded into a heat recoverable tubing of length 25.0 mm, inner diameter of 12.2 mm and wall thickness of 1.0 mm.

The induction coil used for all three samples was a 6-turn solenoid, 57.0 mm long and 38.0 mm in diameter. It was operated at a frequency of 4 MHz with a coil current of 30 amperes rms.

Table II lists the time to swelling for the rods of sample 1, the time to melt for the adhesive sleeves of sample 2 and the time to recovery for the tubing of sample 3, as these articles were positioned parallel and perpendicular to the magnetic field lines.

TABLE II

| Article Orientation | | Sample position relative to the coil field lines | Time (sec) |
| --- | --- | --- | --- |
| 1 | LDPE rods with 2% Ni flakes | Parallel | 7.6 |
|   |   | Normal | 37.6 |
| 2 | Adhesive sleeve with 5% Ni fibers | Parallel | 2.9 |
|   |   | Normal | 32.9 |
| 3 | Heat shrink tubing with 2% Ni flakes | Parallel | 6.3 |
|   |   | Normal | 42.6 |

TABLE II-continued

In all cases illustrated in Table II, the article positioned with its longest dimension parallel to the field lines heats much faster than when positioned perpendicular to the field lines. This is due to the cumulative flux concentration effect that the particles have on each other when aligned adjacent to each other along the same flux line. As mentioned above, similar improved heating rates were observed with articles comprising ferrite spheres when positioned in such a way that a flux line penetrates more particles as it travels through the coil.

EXAMPLE 4

Heat Shrinkable Tubing

The heat shrinkable tubing of Example 4 comprised a host material of low density polyethylene mixed with nickel flakes, particles #1 in Table I, at by volume. The tubing was extruded with an inner diameter of 4.1 mm, beamed at 11 Mrads and expanded to 12.2 mm inner diameter. The heat shrinkable tubing had a length of 25.4 mm. The induction coil used was a 6-turn solenoid, 57.0 mm long and 38.0 mm in diameter operated at a frequency of 4 MHz with coil current 60 amperes rms. The tubing was exposed to the field of the induction coil where it recovered in 6.5 seconds.

Heat shrinkable tubing prepared as described above, but without the nickel flakes, was used as a control against which the properties of the tubing containing nickel flakes were compared. Some of the properties of the control tubing (no nickel flakes) and the properties prior to exposure to the electromagnetic field of the tubing comprising nickel flakes are compared in Table III.

TABLE III

| Heat Shrinkable Tubing | | |
| --- | --- | --- |
| Property | Tubing control (no nickel) | Tubing with 2% nickel flakes |
| Volume resistivity (Ohm-m) | $10^{14}$ | $10^{14}$ |
| Dielectric strength (Volts/mil) | 1000 | 600 |
| Ultimate elongation after heat aging at 150° C. (%) | | |
| 72 hours | 630 | 763 |
| 168 hours | 653 | 708 |
| 288 hours | 490 | 533 |

The volume resistivity of the loaded tubing remained essentially unchanged due to the low volume fraction of particles. The dielectric strength decreased but it is still higher than the dielectric strength required in most applications where the tubing is used. The ultimate elongation of the loaded tubing remained essentially the same as the ultimate elongation of the unloaded tubing even after heat aging for 288 hours at 150° C. In some applications it may be desired to use a dual wall heat shrinkable tubing where the outer layer is not loaded with particles and the inside layer contains the particles, or any combination thereof which includes several layers comprising different polymeric materials with or without ferromagnetic particles.

EXAMPLE 5

Thermoplastic Adhesive

A Unirez dimer polyamide thermoplastic adhesive from Union Camp Co. was mixed with 2% by volume of nickel flakes, particles #1 in Table I, and pressed into square slabs. The slabs had dimensions 25.4 mm×25.4 mm×1.9 mm. The induction coil used was a 6-turn solenoid, 57.0 mm long and 38.0 mm in diameter operated at a frequency of 4 MHz with coil current 60 amperes rms. The slabs were exposed to the field of the induction coil where they melted in 4 seconds.

Slabs of the same Unirez dimer polyamide thermoplastic adhesive and of the same dimensions as described above were also prepared without the addition of nickel flakes. Some of the properties of the control adhesive slabs (no nickel flakes) and the properties prior to exposure to the electromagnetic field of the adhesive slabs comprising nickel flakes are compared in Table IV.

TABLE IV

| Property | Thermoplastic Adhesive | |
|---|---|---|
| | Adhesive control (no nickel) | Adhesive with 2% nickel flakes |
| TMA softening point (°C.) | 155.6 | 156.5 |
| RDA melt viscosity at 150° C. (poise) | $1.8 \times 10^5$ | $1.8 \times 10^5$ |
| RDA melt viscosity at 200° C. (poise) | 100 | 200 |

The results shown in Table IV illustrate that the viscosity of the thermoplastic adhesive remains substantially unaffected by the presence of the nickel flakes.

EXAMPLE 6

Silicone Gel

Sample 1: Part A and part B of a silicone gel were mixed with 0.5% by volume nickel flakes, particles #1 in Table I, in a 19 mm×25.4 mm glass vial and exposed to the field of an induction coil where it cured in 17 seconds. The induction coil used was a 6-turn solenoid, 57.0 mm long and 38.0 mm in diameter, operated at a frequency of 4 MHz with coil current 60 amperes rms.

Sample 2: Comparative gel sample 2 was prepared in the same way as sample 1. However, instead of exposure to the electromagnetic field of the induction coil, this sample was cured in a convection oven at 115° C. for 30 minutes.

Sample 3: Comparative gel sample 3 was prepared in the same way as samples 1 and 2 without the addition of nickel flakes. This sample was cured in a convection oven at 115° C. for 30 minutes.

The properties of sample 1 and comparative samples 2 and 3 are shown in Table V, below. The results of Table V demonstrate that the properties of the gel remain essentially unchanged by the presence of the nickel flakes and by the exposure of the nickel containing gel to the electromagnetic field of the induction coil where it cures extremely fast (17 seconds) compared to conventional curing techniques (30 minutes).

TABLE V

| | Silicone Gel | | |
|---|---|---|---|
| | Silicone Gel Sample | Hardness (g) | Tack (g) |
| 1 | Unloaded-oven cured | 24 | 15 |
| 2 | Loaded-oven cured | 32 | 15 |
| 3 | Loaded-induction cured | 29 | 14 |

Variations and modifications can be made to the preferred embodiment without departing from the scope of the present invention, which is limited only by the following claims.

What is claimed is:

1. A heat generating article for use in an alternating magnetic field, said article comprising a host material in which particles are dispersed, said particles comprising ferromagnetic material having high magnetic permeability and high electrical conductivity, said particles having a skin depth and a configuration including first, second and third orthogonal dimensions, wherein:

said first and second orthogonal dimensions are between 1 μm and 300 μm and greater than the skin depth of the particle when subjected to an alternating magnetic field of a selected frequency; and said first and second orthogonal dimensions are at least 5 times said third orthogonal dimension.

2. The article as defined in claim 1 wherein the article is oriented such that an axis parallel to the greatest dimension of the article is disposed generally parallel with respect to the magnetic field lines.

3. The article as defined in claim 1, wherein said article contains particles in an amount of between about 0.1% and about 50% by volume.

4. The article as defined in claim 3, wherein said article contains particles in an amount of between about 0.5% and about 10% by volume.

5. The article as defined in claim 1, wherein said ferromagnetic material has a Curie temperature at least about equal to the temperature to which said article is to be heated.

6. The article as defined in claim 1, wherein said article undergoes a change in shape upon heating.

7. The article as defined in claim 1, wherein said article undergoes a change in volume upon heating.

8. The article as defined in claim 1, wherein said article undergoes a change in viscosity upon heating.

9. The article as defined in claim 1, wherein said host material is a fusible material having a melt temperature $T_m$.

10. The article as defined in claim 9, wherein said ferromagnetic material has a Curie temperature at least about equal to the melt temperature $T_m$ of said host material.

11. The article as defined in claim 1, wherein said ferromagnetic material comprises a metal or metal alloy.

12. The article as defined in claim I wherein said ferromagnetic material comprises nickel flakes.

13. The article as defined in claim 1, wherein said particle comprises a central carrier portion and a coating.

14. The article as defined in claim 13, wherein said coating comprises a highly magnetic, highly conductive material.

15. The article as defined in claim 1, wherein the initial magnetic permeability of said ferromagnetic material is greater than about 70.

16. The article as defined in claim 1, wherein said material has an electrical conductivity of more than at least about $10^6$ ohm$^{-1}$m$^{-1}$.

17. The article as defined in claim 1, wherein said article contains particles in an amount of up to about 5% by volume, such that the properties of the host material are, thereby, essentially unchanged.

18. The article as defined in claim 1, wherein said ferromagnetic material is a nickel alloy.

19. The article as defined in claim 1, wherein said ferromagnetic material is a nickel aluminum alloy.

20. The article as defined in claim 1, wherein said particles are uniformly dispersed within said host material.

21. The article as defined in claim 1, wherein said particles are non-uniformly dispersed such that at least a portion of said particles are concentrated near a surface of the host material.

22. An arrangement for forming a block in a cable against transmission of fluid along the cable, the cable including a plurality of wires, the arrangement comprising:
a heat activatable blocking construction capable of being positioned in proximity to the wires of the cable, said blocking construction comprising a host material in which particles are dispersed, said particles comprising ferromagnetic material having high magnetic permeability and high electrical conductivity, said particles having a skin depth and a configuration including first, second and third orthogonal dimensions, wherein said first and second orthogonal dimensions are between 1 $\mu$m and 300 $\mu$m and greater than the skin depth of the particle when subjected to an alternating magnetic field of a selected frequency and said first and second orthogonal dimensions are at least 5 times said third orthogonal dimension; and
a cover disposed around said blocking construction.

23. The arrangement as defined in claim 22 wherein said blocking construction comprises a body having a plurality of openings for receiving the wires.

24. The arrangement as defined in claim 22 wherein said cover comprises a host material in which ferromagnetic particles are dispersed, said particles comprising ferromagnetic material having high magnetic permeability and high electrical conductivity, said particles having a skin depth and a configuration including first, second and third orthogonal dimensions, wherein said first and second orthogonal dimensions are greater than the skin depth of the particle and wherein said first and second orthogonal dimensions are at least 5 times said third orthogonal dimension.

25. The arrangement as defined in claim 22 wherein said cover comprises an inner layer and an outer layer.

26. The arrangement as defined in claim 25 wherein said inner layer comprises a host material in which ferromagnetic particles are dispersed, said particles comprising ferromagnetic material having high magnetic permeability and high electrical conductivity, said particles having a skin depth and a configuration including first, second and third orthogonal dimensions, wherein said first and second orthogonal dimensions are greater than the skin depth of the particle and wherein said first and second orthogonal dimensions are at least 5 times said third orthogonal dimension.

27. The arrangement as defined in claim 26 wherein said outer layer is heat recoverable.

28. The arrangement as defined in claim 22 wherein said host material comprises a fusible polymeric sealant.

* * * * *

UNITED STATES PATENT AND TRADEMARK OFFICE

CERTIFICATE OF CORRECTION

PATENT NO. : 5,378,879

INVENTOR(S) : MONOVOUKAS

DATED : January 3, 1995

It is certified that error appears in the above-identified patent and that said Letters Patent is hereby corrected as shown below:

Title Page, item [56] insert missing art--
U.S. Patent Documents

| Document No. | Date | Name | Class | Sub-class |
|---|---|---|---|---|
| 2,393,541 | 01/1946 | Kohler | 20 | 0.5 |
| 3,391,846 | 07/1968 | White | 229 | 17 |
| 3,620,875 | 11/1971 | Guglieimo, Sr. | 156 | 272 |
| 3,620,876 | 11/1971 | Guglieimo, Sr. | 156 | 272 |
| 3,902,940 | 09/1975 | Heller, Jr. et al | 156 | 79 |
| 4,474,676 | 10/1984 | Ishino et al | 252 | 62.54 |
| 4,490,283 | 12/1985 | Kleiner | 252 | 512 |
| 4,503,284 | 03/1985 | Minnick et al | 174 | 36 |
| 4,538,151 | 08/1987 | Hatakeyama et al | 343 | 18A |
| 4,555,422 | 11/1985 | Nakamura et al | 428 | 36 |
| 4,610,808 | 11/1985 | Kleiner | 252 | 512 |
| 4,715,989 | 12/1987 | Sullivan | 252 | 512 |
| 5,009,712 | 04/1991 | Tamari et al | 106 | 456 |
| 5,093,545 | 02/1992 | McGaffigan | 219 | 9.5 |
| 5,106,437 | 04/1992 | Lau et al | 156 | 51 |

UNITED STATES PATENT AND TRADEMARK OFFICE

CERTIFICATE OF CORRECTION

PATENT NO. : 5,378,879

INVENTOR(S) : MONOVOUKAS

DATED : January 3, 1995

It is certified that error appears in the above-identified patent and that said Letters Patent is hereby corrected as shown below:

Title Page, item [56] insert missing art--
U.S. Patent Documents

| Document No. | Date | Name | Class | Sub-class |
|---|---|---|---|---|
| 5,112,229 | 05/1992 | Gilano et al | 434 | 409 |
| 5,118,575 | 06/1992 | Maekawa et al | 428 | 403 |
| 5,126,521 | 06/1992 | McGaffigan | 219 | 10.75 |
| 5,128,504 | 07/1992 | McGaffigan et al | 219 | 10.43 |

Foreign Documents

| | | |
|---|---|---|
| WO 90/03090 | 09/1990 | PCT International Appl. |
| WO 91/11082 | 07/1991 | PCT International Appl. |
| WO 91/11081 | 07/1991 | PCT International Appl. |
| 56-55474 | 05/1981 | Japan |
| 64-4331 | 01/1989 | Japan |
| 3-45683 | 02/1991 | Japan |
| 4-247930 | 09/1992 | Japan |
| 224,547 | 01/1969 | Sweden |

UNITED STATES PATENT AND TRADEMARK OFFICE

CERTIFICATE OF CORRECTION

PATENT NO.         : 5,378,879                                    Page 3 of 4

INVENTOR(S)        : MONOVOUKAS

DATED              : January 3, 1995

It is certified that error appears in the above-identified patent and that said Letters Patent is hereby corrected as shown below:

Title Page, item [56] insert missing art--

Foreign Documents

| Document No. | Date    | Name           | Class | Sub-class |
|--------------|---------|----------------|-------|-----------|
| 588,609      | 05/1947 | United Kingdom |       |           |
| 1,123,266    | 08/1968 | United Kingdom |       |           |
| 1,167,193    | 10/1969 | United Kingdom |       |           |
| 1,339,912    | 05/1973 | United Kingdom |       |           |
| 0,498,993    | 08/1992 | EPO            |       |           |
| 1,906,003    | 09/1969 | Germany        |       |           |

Other Documents

Patent Abstracts of Japan, Vol. 16, No. 558 (E-1294) 27 November 1992 and JP,A,04 213 803 (Riken) 4 August 1992

Patent Abstracts of Japan, Vol. 17, No. 506 (C-1110) 13 September 1993 and JP,A,05 137 802 (Riken) 1 June 1993

Defensive publication T905,001 (du Pont)

UNITED STATES PATENT AND TRADEMARK OFFICE
CERTIFICATE OF CORRECTION

PATENT NO.    : 5,378,879

INVENTOR(S)   : MONOVOUKAS

DATED         : January 3, 1995

It is certified that error appears in the above-identified patent and that said Letters Patent is hereby corrected as shown below:

Column 4, Line 28 replace "3,941,6411" by --3,941,641--.

Column 12, Line 4 replace "fiat" by --flat--.

Column 12, Line 15 replace "fiat" by --flat--.

Column 16, Line 26 after "at" insert --2%--.

Signed and Sealed this

Fourth Day of June, 1996

Attest:

BRUCE LEHMAN

*Attesting Officer*         *Commissioner of Patents and Trademarks*